US006757896B1

(12) United States Patent
Cohen et al.

(10) Patent No.: US 6,757,896 B1
(45) Date of Patent: Jun. 29, 2004

(54) METHOD AND APPARATUS FOR ENABLING PARTIAL REPLICATION OF OBJECT STORES

(75) Inventors: Norman H. Cohen, Spring Valley, NY (US); Ajay Mohindra, Yorktown Heights, NY (US); Apratim Purakayastha, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,645

(22) Filed: Jan. 29, 1999

(51) Int. Cl.[7] .............................................. G06F 9/00
(52) U.S. Cl. ....................................... 718/100; 707/201
(58) Field of Search ............................... 707/201, 203; 709/248; 711/141; 718/100

(56) References Cited

U.S. PATENT DOCUMENTS

| | | | | | |
|---|---|---|---|---|---|
| 5,758,337 | A | * | 5/1998 | Hammond | 707/6 |
| 5,787,247 | A | * | 7/1998 | Norin | 709/220 |
| 5,794,253 | A | * | 8/1998 | Norin et al. | 707/203 |
| 5,799,306 | A | * | 8/1998 | Sun | 707/10 |
| 5,926,816 | A | * | 7/1999 | Bauer | 707/8 |
| 6,049,809 | A | * | 4/2000 | Raman et al. | 707/203 |
| 6,189,011 | B1 | * | 2/2001 | Lim et al. | 707/102 |
| 6,269,432 | B1 | * | 7/2001 | Smith | 711/162 |
| 6,343,299 | B1 | * | 1/2002 | Huang et al. | 707/203 |

OTHER PUBLICATIONS

Maria A. Butrico et al, "Gold Rush: Mobile Transaction Middleware with Java–Object Replication," Jun. 16–19, 1997, p. 91–101.*
Norman H. Cohen, "Application Programmer's Guide to Mobile Network Computer Data Synchronization," Version 0.7, Mar. 12, 1998.
Roger Riggs, "Data Synchronization Architecture Document," Version 0.7, Mar. 4, 1998.
"Mobile Network Computer Reference Specification", Version 1.0, Mar. 13, 1998.

* cited by examiner

Primary Examiner—Meng-Al T. An
Assistant Examiner—Li B. Zhen
(74) Attorney, Agent, or Firm—Louis P. Herzberg; F. Chau & Associates, LLC

(57) ABSTRACT

Method and apparatus are provided for enabling partial replication of object stores, wherein two or more computers can partially replicate object stores by allowing synchronization of only such objects contained in the stores that are intended to be shared among the stores.

38 Claims, 5 Drawing Sheets

Version Vector

DATA STRUCTURE ASSOCIATED WITH EVERY REPLICA OF A STORE

Different Message Types

METHOD AND APPARATUS FOR ENABLING PARTIAL REPLICATION OF OBJECT STORES

BACKGROUND

1. Technical Field

The present invention relates generally to object stores and, in particular, to a method and apparatus that enables two or more computers to partially replicate object stores by allowing synchronization of only such objects contained in the stores that are intended to be shared among the stores.

2. Background Description

In general, an object is a collection of data and/or functions which, for example, modify the data. An object store is a collection of objects. The objects in the store can either be persistent or transient. The object store provides a set of application programming interfaces for manipulating (e.g., reading, modifying and deleting) objects in the store. An object store controller is an application written 'on top' of an object store that manipulates the contents of the store.

FIG. 1 is a diagram illustrating a system to which the present invention may be applied. The system 100 includes two computers (102a, 102b). Each computer (102a, 102b) respectively includes: an object store (106a, 106b); an object store controller (104a, 104b); at least one application (120a, 120b); and a communication system (108a, 108b). The controllers (104a, 104b) are used by the applications (120a, 120b) to access and modify the object stores (106a, 106b). The communication systems (120a, 120b) enable the (system) computers (102a, 102b) to communicate with other computers. Further, the computers (102a 102b) may be either intermittently or continuously connected to one another via a communication network 112.

The Mobile Network Computer Reference Specification (MNCRS) provides a method and apparatus for synchronizing the full content of two object stores (www.mncrs.org). Every object in a store is identified by a unique object identifier. Object stores are replicated among two or more computers. Hence, a single object (identified by its unique identifier) is replicated among those computers. Different replicas of an object are potentially updated on different computers. Two replicas of an object store are synchronized periodically. Synchronization is realized using a version data structure associated with each object.

FIG. 2A is a diagram illustrating a conventional version vector data structure associated with each object in an object store. The version vector 202 includes a list of tuples 204. Each tuple 204 contains a node identifier 206 and a clock value 208. The node identifier 206 may be implemented as, for example, a simple integer that is associated with a particular computer (e.g., 102a, 102b) in the system. The clock value may be implemented as an integer reflecting a logical value. Thus, the kth tuple in the version vector 202 represents the node identifier and the local clock value for a particular object at the kth computer.

When an object is updated or inserted in an object store of a computer, the tuple in the version vector corresponding to that computer is updated with the current local clock value at that computer. Then, the local clock value is incremented. The version vectors of an object and its replica are compared as follows: for every index k, the clock value of the kth tuple in the version vector of the object is compared with the clock value of the kth tuple in the version vector of the replica. Thus, when comparing two version vectors (of an object and its replica), the object's version vector is considered to be newer than the replica's version vector when all the clock values of the object's version vector are equal to or greater than all the corresponding clock values of the replica's version vector. Alternatively, the object's version vector is considered to be older than the replica's version vector when all the clock values of the object's version vector are less than or equal to all the corresponding clock values of the replica's version vector. If only some clock values of the object's version vector are greater than or equal to corresponding clock values in the replica's version vector and other clock values in the object's version vector are less than the corresponding clock values in the replica's version vector, then the object and its replica are considered to be 'in conflict'.

The version vector of an object is incremented as follows: if the kth computer in the system is incrementing the version vector, the clock value in the kth tuple of the version vector is updated with the local clock value and then the local clock value is incremented. The content of the object is not altered.

Similar to each object in an object store, the store itself is associated with a summary version vector. The summary version vector of the store includes a list of tuples, each tuple containing a node identifier and a clock value. The clock value in the kth tuple in the summary version vector for a store is the maximum of the clock values in the kth tuples in the version vectors for all objects in the store. Hence, all objects in the store are, at most, as recent as the summary version vector of the store. As a result, when the version vector of an object in one store is compared with the summary version vector of a replica store, if the version vector of the object is strictly older than the summary version vector of the replica store, then it can be concluded that the replica store has seen this object already. However, if the version vector of the object is newer than or conflicts with the summary version vector of the replica store, then it can be concluded that the replica store may not have seen this object.

FIG. 2B illustrates how two object stores perform a full synchronization in MNCRS. The controller for store1 ('store1 controller') requests the summary version vector of store2 from the controller of store2 ('store2 controller') (step 210). In response, the store2 controller sends the store2 summary version vector to the store1 controller (step 212). The store1 controller determines which objects in store1 are newer than, or conflict with, the summary version vector sent by store2 (step 214). The store1 controller then sends those objects (updates) to the store2 controller (step 216) using its communication system 108 via the communication network 112. As used herein, an update consists of an object's contents, its identifier, and its version vector. The object content part of an update can optionally be empty for an update that signifies deletion of an object.

The store2 controller then applies those objects (updates) locally to the objects in store2 (step 218). Applying an update may consist of copying the replica object's contents to the local object, merging the replica object's contents with those of the local object, or simply keeping the original contents of the local object. In either case, the version vector of the local object is changed to a newer version vector reflecting that the object in store2 has been synchronized with its replica in store1.

The store2 controller first requests the summary version vector from the store1 controller (step 220). In response, the store1 controller sends the store1 summary version vector to the store2 controller (step 222). The store2 controller determines which objects in store2 are newer than, or conflict with, the summary version vector sent by store1 (step 224). The store2 controller then sends those objects (updates) to the store1 controller (step 226) using its communication system 108 via the communication network 112.

The store1 controller then applies those objects (updates) locally to the objects in store1 (step 228). Accordingly, the version vector of the local object is changed to a newer version vector reflecting that the object in store2 has been synchronized with its replica in store1. Thus, the two replicas have completed synchronization.

In the above method, each object in one store is synchronized with its counterpart in another store. The effect of such synchronization is that replicas fully share their contents. Such complete sharing may not be desirable in certain circumstances. For example, consider two traveling salesmen employed by a national company. One salesman covers the states of New York, Connecticut and Rhode Island, while the other salesman covers the states of New Jersey, New York and Pennsylvania. Each salesman has his customer information in a single object store in his mobile computer. Both salesman would only like to share information about their common customer base, that is, only those in the state of New York. Given that, for each salesman, all of his customers are in the same object store, synchronization in the above fashion would not,allow partial sharing of information.

In the context of the above example, one skilled in the art can easily infer that if the salesmen maintained separate object stores (i.e., one each for New York, Connecticut and Rhode Island), and then only synchronized the New York object store following the steps shown in FIG. 2B, they could achieve the same effect of partial sharing. Such a solution however is only ad hoc and not general or extensible.

For example, consider a third salesman that covers the states of New York, Rhode Island and New Jersey. Further, assume that all the salesmen want to share information about their common customer base and no more. To achieve this using the method shown in FIG. 2B, the first salesman needs to maintain separate object stores for customers in New York, and for customers in New York and Rhode Island; the second salesman needs to maintain separate object stores for customers in New York, and for customers in New York and New Jersey; and the third salesman needs to maintain separate object stores for customers in New York and Rhode Island, and for customers in New York and New Jersey. In addition to the separate stores, there must be a mechanism to keep consistency among overlapping stores in one mobile computer. That is, if the New York store of the first salesman is updated via synchronization with the New York store of the second salesman, there must be a mechanism to propagate the updates to the New York entries in the New York and Rhode Island store of the first salesman. Clearly, this approach is costly with respect to the time and space requirements necessary for its realization. Moreover, the approach is intractable for various sharing patterns that may exist among various salesmen in a national company. Thus, it would be desirable and highly advantageous to have a method and apparatus for synchronizing two replica object stores that enables partial sharing of the contents of object stores.

SUMMARY OF THE INVENTION

The present invention is directed to a method that enables two or more computers to partially replicate object stores by allowing synchronization of only such objects contained in the stores that are intended to be shared among the stores. In one aspect of the present invention, a method for synchronizing replica object stores store1 and store2 to enable partial sharing of objects therebetween, wherein store1 and store2 respectively have store1 and store2 controllers associated therewith, comprises the steps of:

(a) applying a filter F to the objects in store1 to generate a subset S comprising the objects in store1 to be shared with store2, wherein the filter F embodies an operation that can be applied to the objects in store1 and store2, the applying by the store1 controller;

(b) incrementing version information of the objects that were not shared between store1 and store2 as of a last synchronization but should now be shared, and of the objects that were shared between store1 and store2 as of the last synchronization but should no longer be shared, by the store1 controller;

(c) determining which objects in either the subset S or those identified by object identifiers in a list L have the version information that is newer than or conflicting with version information of store2, wherein the list L comprises object identifiers of the objects shared between store1 and store2 as of the last synchronization, the determining by the store1 controller;

(d) applying updates associated with the determined objects, by the store2 controller;

(e) updating the lists L of store2 and store1, by the store2 and store1 controllers, respectively; and (f) repeating steps (a) through (e), with roles of the store1 with respect to the store2 reversed, and roles of the store1 controller with respect to the store2 controller reversed.

An embodiment of the present invention further comprises the step of maintaining respective data structures for store1 and store2 comprising the filter F and the list L, by the store2 and store2 controller, respectively.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

The present invention is directed to a method and apparatus for enabling partial replication of object stores. That is, the invention enables two or more computers to partially replicate object stores by allowing synchronization of only such objects contained in the stores that are intended to be shared among the stores. To facilitate a clear understanding of the present invention, the following description will be given based on two computers. However, it is to be appreciated that the invention can be easily extended to cover partial sharing of object stores between more than two computers by anyone skilled in the art.

Figure 1:
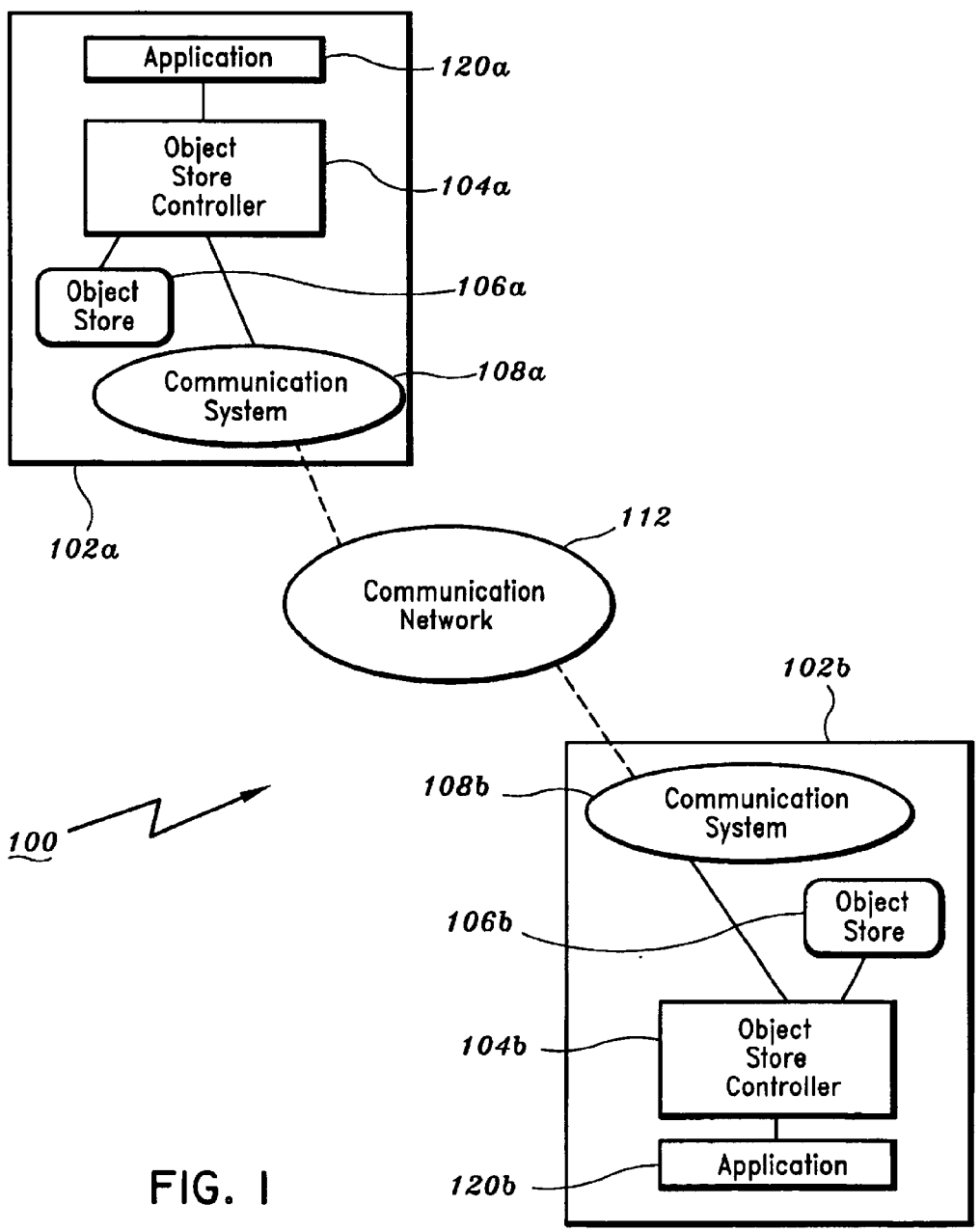
FIG. 1 is a block diagram illustrating a system to which the present invention may be applied.

As described above, FIG. 1 is a diagram illustrating a system to which the present invention may be applied. The system 100 includes two computers (102a, 102b). Each computer (102a, 102b) respectively includes: an object store (106a, 106b); an object store controller (104a, 104b); at least one application (120a, 120b); and a communication system (108a, 108b). The controllers (104a, 104b) are used by the applications (120, 120b) to access and modify the object stores (106a, 106b). The communication systems (120a, 120b) enable the computers (102a, 102b) to communicate with other computers. Further, the computers (102a 102b) may be either intermittently or continuously connected to one another via a communication network 112.

The two computers (102a, 102b) may be implemented in, for example, cellular phones, mobile palm-size computers, mobile handheld computers, mobile laptop computers, desktop computers, minicomputers or mainframe computers. The computers (102a, 102b) may run operating systems such as, for example, Microsoft's Windows CE/95/98/NT or IBM's AIX/MVS.

The object stores (106a, 106b) may be implemented in, for example, a file system (e.g., AFS, NFS and DFS), or a database (IBM's DB2). The object store controllers (104a, 104b) may be implemented in an independent process or a thread. The communication protocol implemented by system 100 may be, for example, HTTP, TCP/IP, UDP, or Infra-red based protocols such as IrDA. The communication network 112 can be, for example, a Local Area Network (LAN), cellular phone network, Personal Area Network (PAN), or a Wide Area Network (WAN).

The above examples of the implementations of the elements of system 100 are merely exemplary and are not intended to comprise an exhaustive list. One of ordinary skill in the art will contemplate many other implementations of such elements.

Figure 3:
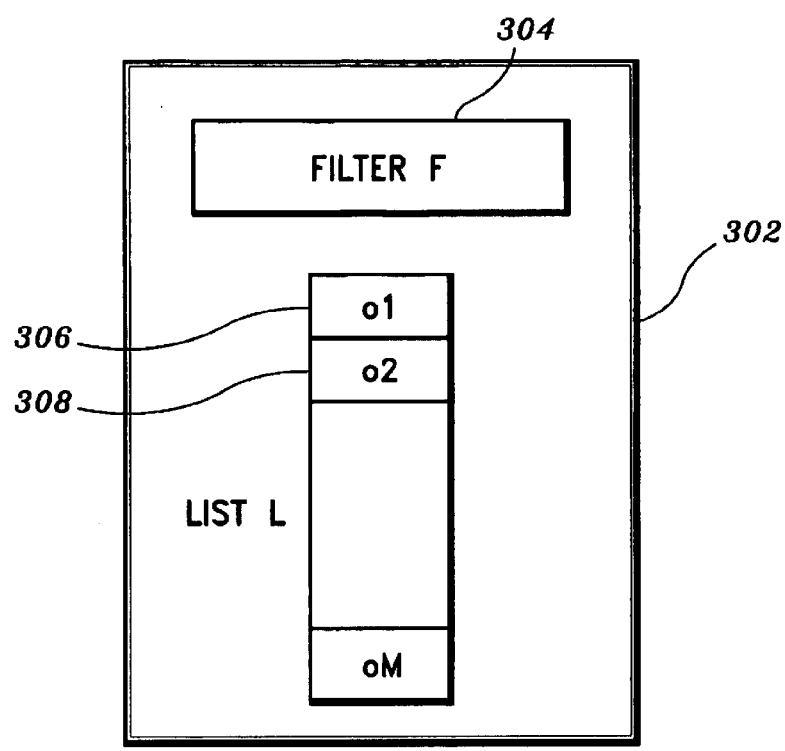
FIG. 3 is a diagram illustrating a data structure that the object store controller of each object store maintains for every replica of that store, in accordance with an embodiment of the present invention.

FIG. 3 is a diagram illustrating a data structure 302 that the object store controller of each object store maintains for every replica of that store, in accordance with an embodiment of the present invention. Thus, as applied to the components of FIG. 1, the data structure shown in FIG. 3 is maintained by object store controllers 104a, 104b of object stores 106a, 106b, respectively, for every replica of those stores. Each data structure 302 includes a filter F 304 and a list L 306.

The filter F embodies an operation that can be applied to the objects in the store. In one embodiment of the present invention, the filter F is embodied as a SQL SELECT statement which, when applied to the contents of an object store, produces a subset of objects currently in that store. It is the objects in the subset that are to be shared with the replica.

In accordance with the present invention, the collection of objects in a store is designated as a set S1, and the filter F is designated as a function F. The function F when applied to the set S1 produces a set S, where S is a subset of S1. Mathematically, this may be represented as follows:

$$F(S1)=S;$$

$$S<=S1.$$

The filter F may consist of conditions defined on the values of the fields of an object. For example, the filter may be an SQL SELECT statement such as, for example, "SELECT * WHERE state =New York". In such a case, an object that currently 'satisfies' the filter may no longer satisfy the filter (or vice-versa) due to updates to the object that cause changes to the object's relevant field values. On the other hand, a filter may capture conditions or events which are extraneous to the objects. For example, the filter "files created less than 7 days ago" may be used for two replicas that only want to share recently created files. In such a case, an object that currently satisfies the filter may no longer satisfy the filter (or vice-versa) even without an update of the object. For two stores store1 and store2 having current sets of objects S1 and S2, respectively, and a filter F that defines the set of shared objects between the two stores, the following equation must hold at steady state (i.e., just after synchronization, before any local updates are made to the objects in either store):

$$F(S1)=S=F(S2)$$

As stated above, each data structure 302 also contains a list L 306. The list L 306, in turn, contains all the object identifiers 308 of the objects that are shared with the replica as of the last synchronization with the replica. Before the first synchronization with the replica, the list is initialized to be an empty list.

Figure 4:
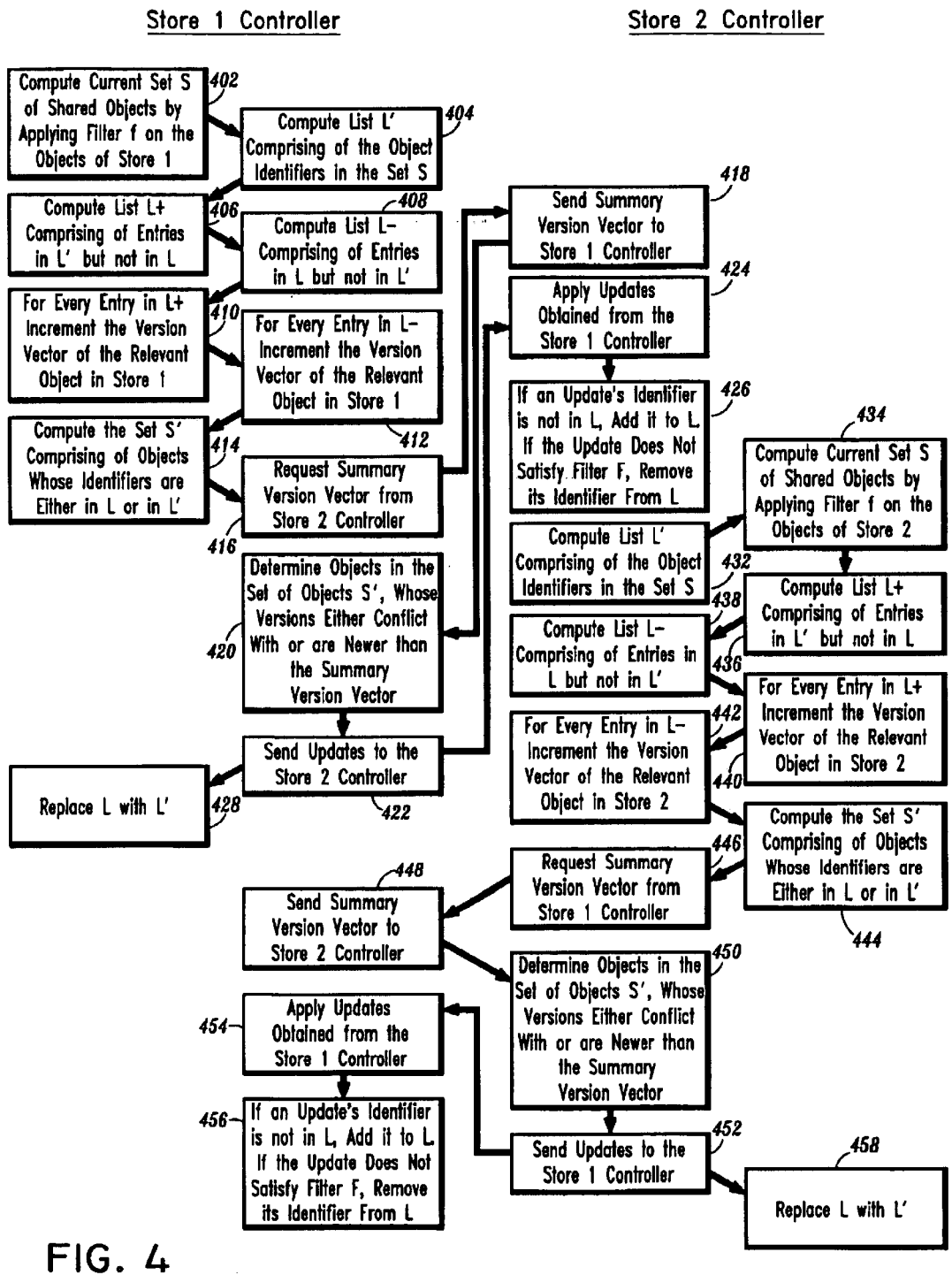
FIG. 4 is a flow diagram illustrating a method for partially synchronizing objects in two object stores in accordance with an embodiment of the present invention.
Figure 5:
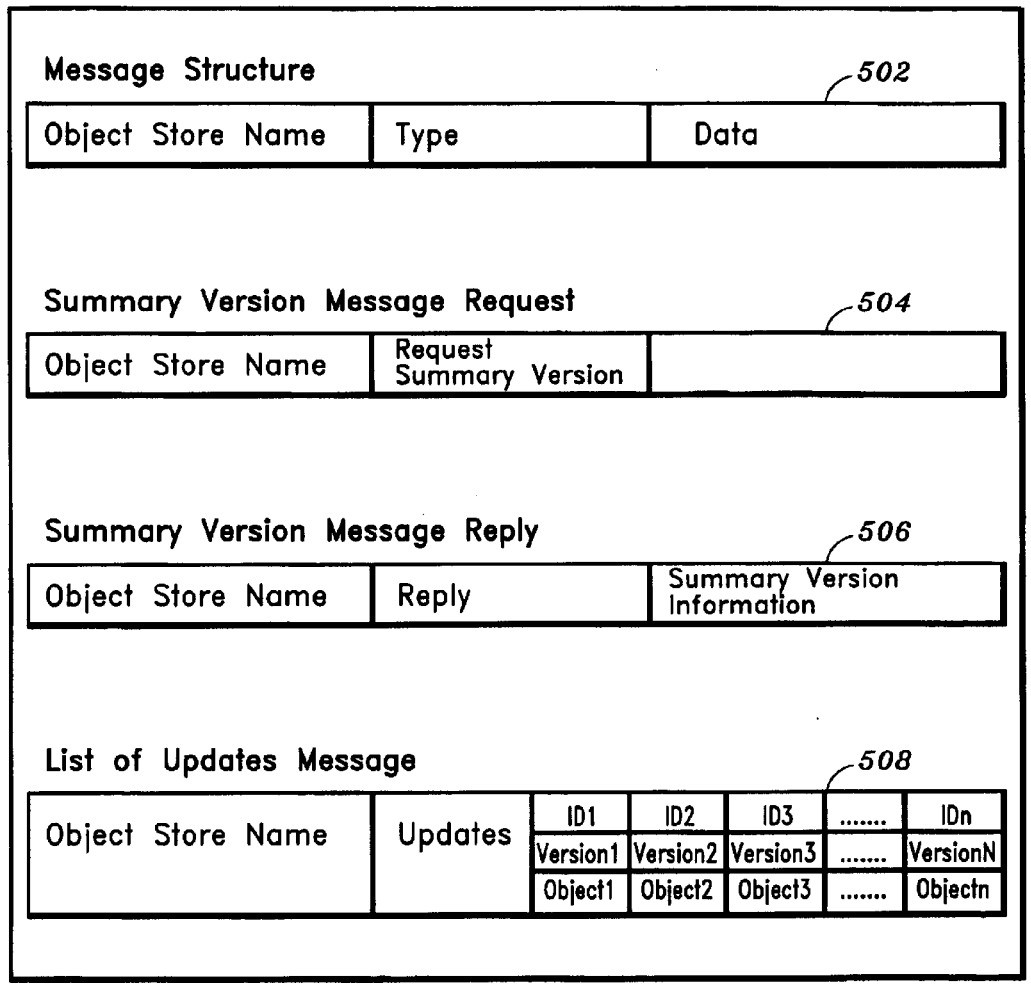
FIG. 5 is a block diagram illustrating the different message types used for synchronizing objects in accordance with the method of FIG. 4.

FIG. 4 is a flow diagram illustrating a method for partially synchronizing objects in two object stores in accordance with an embodiment of the present invention, and FIG. 5 is a block diagram illustrating the different messages exchanged between the two object stores in accordance with the method of FIG. 4.

To facilitate a clear understanding of the steps described in FIG. 4, a brief description of the messages exchanged during the synchronization method will now be given with reference to FIG. 5. Initially, the structure 502 of each message consists of three fields: (1) the name of the object store; (2) the message type; and (3) data.

The messages include: a Request Summary Version Message 504; a Summary Version Message Reply 506; and a List of Updates Message 508.

The Request Summary Version Message 504 contains the name of the object store whose summary version is being requested, and has its type field set to "Request Summary Version". The Summary Version Message Reply 506, which is sent in response to the Summary Version Message Request Message 504, contains the name of the object store to which the summary version is to be provided (i.e., the destination object store). The message type and data fields of the Summary Version Message Reply 506 are set to "Reply" and the Summary Version of the (destination) object store, respectively. The List of Updates Message 508 contains the name of the destination object store. The message type and data fields of the List of Updates Message 508 are set to "Updates" and a list of <ID, version, object>triplets that describe the updates, respectively. The ID component describes the object and the data component contains the update corresponding to that object identifier.

Returning to FIG. 4, the steps executed by the object controllers of the two object stores when synchronization is to be performed will now be described. The synchronization is between two replica stores Store1 and Store2, and allows for partial sharing of their contents. An object controller initiates synchronization when a user selects the SYN- CHRONIZE option from the application 120a, 120b menu associated with the object controller. A user need only initiate synchronization from one computer.

The store1 controller first computes the set S that satisfies the filter F (step 402). The set S therefore consists of those objects in store1 that are to be currently shared with store2. The store1 controller then computes the list L' that is comprised of the object identifiers of the objects in set S (step 404).

The store1 controller computes a list $L^+$ that contains entries that are in the list L' but not in the list L (step 406). That is, the list $L^+$ contains object identifiers for those objects that were not previously shared between store1 and store2 but should now be shared.

Then, the store1 controller computes a list $L^-$ that contains entries that are in the list L but are not in the list L' (step 408). The list $L^-$ contains object identifiers for those objects that were previously shared between store1 and store2 but should no longer be shared.

Figure 2A:
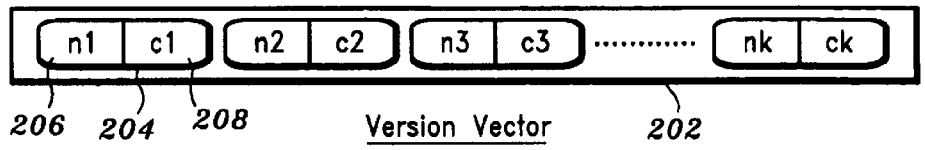
FIG. 2A is a diagram illustrating a conventional version vector data structure associated with each object in an object store.
Figure 2B:
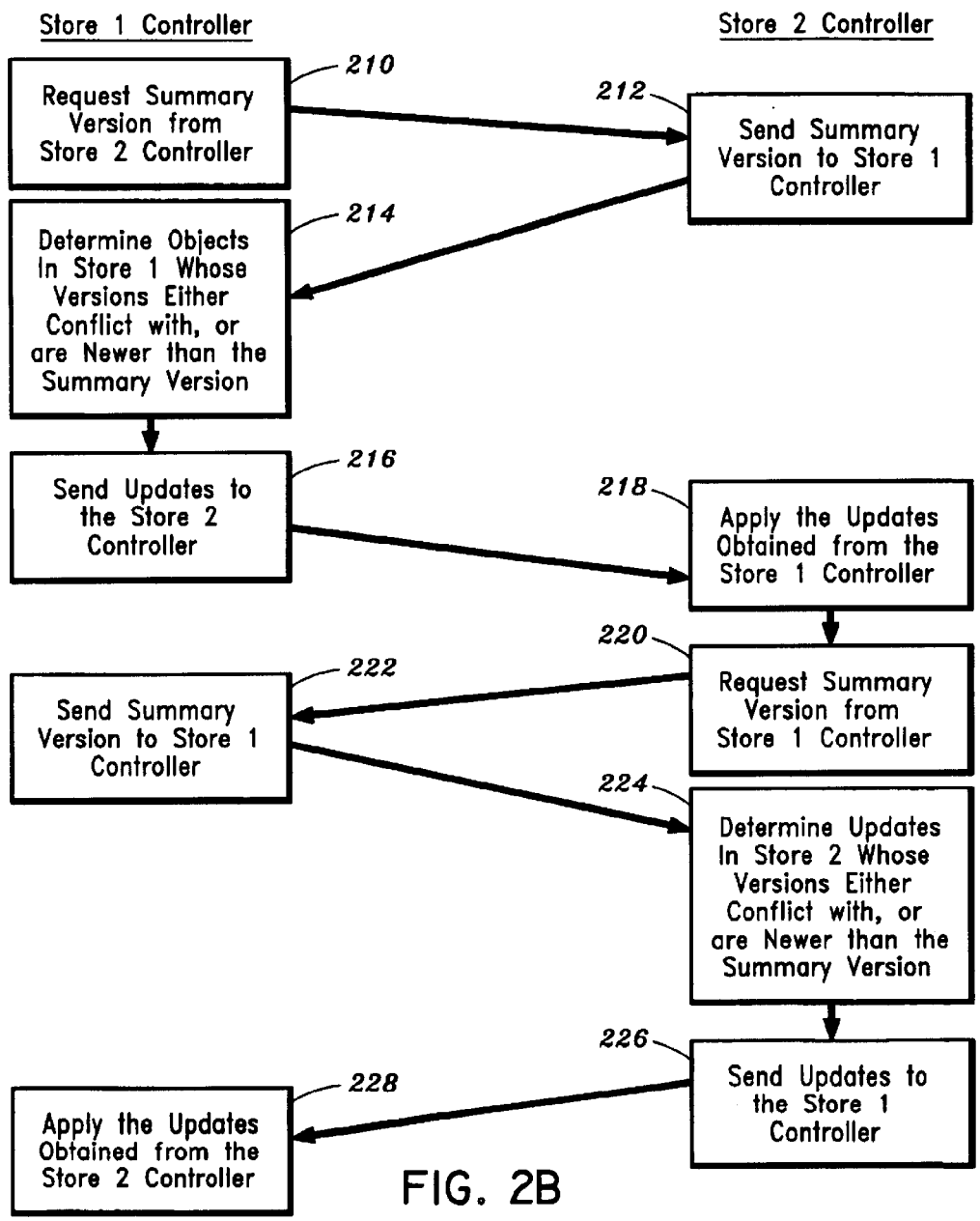
FIG. 2B is a flow diagram illustrating a conventional method for synchronizing two object stores, wherein all of the objects in each of the two stores are synchronized therebetween.

Objects (updates) identified by the object identifiers in the lists $L^+$ and $L^-$ must be communicated to the store2 controller for proper synchronization since these are objects that have either 'entered' the share of objects or 'exited' the share of objects between the two stores. An object that previously satisfied the filter F may no longer satisfy the filter (or vice-versa) because of a change to either a local update made to the object or some system state extraneous to the object, which happens to be part of the filter F. Objects whose identifiers are in $L^+$ and $L^-$ by virtue of actual updates made to such objects, have incremented version vectors that are newer than, or conflicting with, the summary version vector of store2, and will be normally included in the set of objects (updates) sent to the store2 controller (FIG. 2B). However, objects whose identifiers are in $L^+$ and $L^-$ by virtue of extraneous state changes will not normally be included in the set of objects (updates) sent to the store2 controller, since they may have version vectors that are strictly older than the store2 summary version vector because no actual updates were made to those objects since the last synchronization.

The version vectors of the objects in $L^+$ and $L^-$ are incremented in steps 410 and 412, thereby guaranteeing that version vectors for these objects will be newer than, or conflicting with, the summary version vector of store2. At this point, the store1 controller constructs a set S' consisting of objects whose identifiers are either in the list L or the list L' (step 414). That is, the set S' contains all objects that either have entered the share, or have left the share, or continue to be in the share as before.

Now, the store1 controller requests the summary version vector from the store2 controller (step 416) by sending a Summary Version Message Request 504. The store2 controller sends the summary version vector to the store1 controller (step 418) by sending the Summary Version Message Reply 506.

The store1 controller determines which objects in the set S' have versions that are newer than, or conflict with, the summary version vector of store2 (step 420). The store1 controller then sends those objects (updates) to the store2 controller (step 422) by sending the List of Updates Message 508.

The store2 controller then applies the received updates in the same way as discussed with respect to FIG. 2B (step 424). After applying the updates, the store2 controller updates its local list L by adding object identifiers to the list L for all the received updates that were not already present in the list L, and by removing object identifiers from the list L for all the received updates whose objects no longer satisfy the filter F (step 426). The store1 controller updates (i.e., replaces) its own list L with the list L' (step 428).

Thereafter, the store2 and the store1 controller follow steps 432 through 458, which are exactly the same as steps 402 through 428 with the roles of store1 and store2 reversed. After completion of step 458, the two stores have completed the synchronization that synchronized their contents partially. A description of steps 432 through 458 will now be given to fully describe the above synchronization method.

The store2 controller computes the set S that satisfies the filter F (step 432). The set S therefore consists of those objects in store2 that are to be currently shared with store1. The store2 controller then computes the list L' that is comprised of the object identifiers of the objects in set S (step 434).

The store2 controller computes a list $L^+$ that contains entries that are in the list L' but not in the list L (step 436). That is, the list $L^+$ contains object identifiers for those objects that were not previously shared between store1 and store2 but should now be shared.

Then, the store2 controller computes a list $L^-$ that contains entries that are in the list L but are not in the list L' (step 438). The list $L^-$ contains object identifiers for those objects that were previously shared between store1 and store2 but should no longer be shared.

Objects (updates) identified by the object identifiers in the lists $L^+$ and $L^-$ must be communicated to the store1 controller for proper synchronization since these are objects that have either 'entered' the share of objects or 'exited' the share of objects between the two stores. An object that previously satisfied the filter F may no longer satisfy the filter (or vice-versa) because of a change to either a local update made to the object or some system state extraneous to the object, which happens to be part of the filter F. Objects whose identifiers are in $L^+$ and $L^-$ by virtue of actual updates made to such objects, have incremented version vectors that are newer than, or conflicting with, the summary version vector of store1, and will be normally included in the set of objects (updates) sent to the store1 controller (FIG. 2B). However, objects whose identifiers are in $L^+$ and $L^-$ by virtue of extraneous state changes will not normally be included in the set of objects (updates) sent to the store1 controller, since they may have version vectors that are strictly older than the store1 summary version vector because no actual updates were made to those objects since the last synchronization.

The version vectors of the objects in $L^+$ and $L^-$ are incremented in steps 440 and 442, thereby guaranteeing that version vectors for these objects will be newer than, or conflicting with, the summary version vector of store1. At this point, the store2 controller constructs a set S' consisting of objects whose identifiers are either in the list L or the list L' (step 444). This set S' actually contains objects whose identifiers are in $L^+$ or in $L^-$ or in both L and L'. That is, the set S' contains all objects that either have entered the share, or have left the share, or continue to be in the share as before.

Now, the store2 controller requests the summary version vector from the store1 controller (step 446) by sending a Summary Version Message Request 504. The store1 controller sends the summary version vector to the store2 controller (step 448) by sending the Summary Version Message Reply 506.

The store2 controller determines which objects in the set S' have versions that are newer than, or conflict with, the summary version vector of store1 (step 450). The store2 controller then sends those objects (updates) to the store1 controller (step 452) by sending the List of Updates Message 508.

The store1 controller then applies the received updates in the same way as discussed with respect to FIG. 2B (step 454). After applying the updates, the store1 controller updates its local list L by adding object identifiers to the list L for all the received updates that were not already present in the list L, and by removing object identifiers from the list L for all the received updates whose objects no longer satisfy the filter F (step 456). The store2 controller updates (i.e., replaces) its own list L with the list L' (step 458).

After completion of step 458, the two stores have completed the synchronization method according to an embodiment of the present invention. As such, only those objects which are desired to be shared among the two computers may, in fact, be so shared.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for synchronizing a plurality of replica object stores to enable partial sharing of objects therebetween, wherein the stores respectively have store controllers associated therewith, the method comprising the steps of:
   (a) maintaining a plurality of data structures, wherein one of the data structures is associated with one of the stores and each data structure comprises a filter F and a list L, the filter F embodying an operation that can be applied to the objects in the stores, the list L comprising object identifiers of the objects that are shared between the stores as of a last synchronization;
   (b) applying the filter F of a first store to the objects in the first store to generate a subset S comprising the objects in the first store to be shared with remaining stores of the plurality of stores, by a first store controller;
   (c) incrementing version information of the objects of the first store that were not shared between the stores as of the last synchronization but should now be shared, and of the objects of the first store that were shared between the stores as of the last synchronization but should no longer be shared, by the first store controller;
   (d) transferring version information of objects in the remaining plurality of stores corresponding to the objects in subset S, to the first store controller, from the remaining plurality of store controllers;
   (e) determining one of which objects in subset S and identified by object identifiers in list L of the first store have the version information that is one of newer than and conflicting with version information of the remaining stores, by the first store controller;
   (f) applying updates associated with the determined objects, by remaining store controllers;
   (g) updating the lists L of each of the plurality of stores, by the plurality of store controllers; and
   (h) repeating steps (b) through (g) for a next store of the remaining stores, with roles of the first store now performed by the next store, and the remaining stores now being all stores of the plurality of stores except the next store.

2. The method according to claim 1, wherein said determining step further comprises the step of obtaining the version information of the remaining stores, by the first store controller.

3. The method according to claim 2, wherein said obtaining step comprises the steps of:
   requesting the version information of the remaining stores, by the first store controller; and
   sending the version information of the remaining stores to the first store, by the remaining controllers.

4. The method according to claim 3, wherein said requesting step comprises the step of sending a Summary Version Message Request.

5. The method according to claim 3, wherein said sending step comprises the step of sending a Summary Version Message Reply.

6. The method according to claim 1, wherein said method further comprises the step of sending the determined objects to the remaining controllers, by the first store controller.

7. The method according to claim 6, wherein said sending step comprises the step of sending a List of Updates Message.

8. The method according to claim 1, wherein the updates comprise a content, the identifier and the version information of the object.

9. The method according to claim 1, wherein said step of applying the updates comprises, for each update, one of the steps of:
   copying a content of a determined object to a corresponding local object in the remaining stores;
   merging the content of the determined object with a content of the corresponding local object in the remaining stores; and
   keeping an original content of the corresponding local object in the remaining stores.

10. The method according to claim 1, wherein said updating step comprises the steps of:
   adding object identifiers to the list L of the remaining stores for all the updates that were not already present in the list L of the remaining stores;
   removing object identifiers from the list L of the remaining stores for all the updates whose objects no longer satisfy the filter F; and
   updating the list L of the first store with a list L'.

11. The method according to claim 1, wherein the version information of the objects comprises a clock value associated with a last time the respective objects were modified.

12. A method for synchronizing replica object stores store1 and store2 to enable partial sharing of objects therebetween, wherein the store1 and store2 respectively have store1 and store2 controllers associated therewith, the method comprising the steps of:
   (a) maintaining a first list L for store1 and a second list L for store2, the first list L and the second list L comprising object identifiers of the objects that are shared between store1 and store2 as of a last synchronization;
   (b) applying a filter F to the objects in the store1 to generate a subset S comprising the objects in the store1 to be shared with the store2, wherein the filter F embodies an operation that can be applied to the objects in the store1 and store2, said applying by the store1 controller;
   (c) incrementing version information of the objects that were not shared between the store1 and store2 as of a last synchronization but should now be shared, and of the objects that were shared between the store1 and store2 as of the last synchronization but should no longer be shared, by the store1 controller;
   (d) transferring version information of objects in the store2 corresponding to objects in the subset S, to the store1 controller from the store2 controller;

(e) determining one of which objects in the subset S and identified by object identifiers in the first list L have the version information that is one of newer than and conflicting with version information of the store2, said determining by the store1 controller;

(f) applying updates associated with the determined objects, by the store2 controller;

(g) updating the lists L of the store2 and the store1, by the store2 and store1 controllers, respectively; and (h) repeating steps (b) through (g), with roles of the store1 with respect to the store2 reversed, and roles of the store1 controller with respect to the store2 controller reversed.

13. The method according to claim 12, further comprising the step of:

maintaining respective data structures for the store1 and store2 comprising the filter F and the list L, by the store1 and store2 controller, respectively.

14. The method according to claim 12, wherein said determining step further comprises the step of obtaining the version information of the store2, by the store1 controller.

15. The method according to claim 14, wherein said obtaining step comprises the steps of:

requesting the version information of the store2, by the store1 controller; and sending the version information of the store2 to the store1, by the store2 controller.

16. The method according to claim 15, wherein said requesting step comprises the step of sending a Summary Version Message Request.

17. The method according to claim 15, wherein said sending step comprises the step of sending a Summary Version Message Reply.

18. The method according to claim 12, wherein said method further comprises the step of sending the determined objects to the store2 controller, by the store1 controller.

19. The method according to claim 18, wherein said sending step comprises the step of sending a List of Updates Message.

20. The method according to claim 12, wherein the updates comprise a content, the identifier and the version information of the object.

21. The method according to claim 12, wherein said step of applying the updates comprises, for each update, one of the steps of:

copying a content of a determined object to a corresponding local object in the store2;

merging the content of the determined object with a content of the corresponding local object in the store2; and keeping an original content of the corresponding local object in the store2.

22. The method according to claim 12, wherein said updating step comprises the steps of:

adding object identifiers to the list L of the store2 for all the updates that were not already present in the list L of the store2;

removing object identifiers from the list L of the store2 for all the updates whose objects no longer satisfy the filter F; and updating the list L of the store1 with a list L'.

23. The method according to claim 12, wherein the version information of the objects comprises a clock value associated with a last time the respective objects were modified.

24. A method for synchronizing two replica object stores store1 and store2 to enable partial sharing therebetween, the store1 and store2 respectively having store1 and store2 controllers associated therewith, the method comprising the steps of:

(a) maintaining a first list L for store1 and a second list L for store2, the first list L and the second list L comprising object identifiers of the objects that are shared between store1 and store2 as of a last synchronization;

(b) applying a filter F to the objects in the store1 to generate a subset S comprising the objects in the store1 to be shared with the store2, wherein the filter F embodies an operation that can be applied to the objects in the store1 and store2, said applying by the store1 controller;

(c) computing a list L' that comprises object identifiers of the objects in the subset S, by the store1 controller;

(d) computing a list $L^+$ that comprises entries that are in the list L' but not in the first list L, by the store1 controller;

(e) computing a list L− that contains entries that are in the first list L but are not in the list L', by the store1 controller;

(f) incrementing version information of the objects in $L^+$ and $L^-$, by the store1 controller;

(g) constructing a set S' comprising objects whose identifiers are in one of the list L or the list L', by the store1 controller;

(h) transferring version information of objects in the store2 corresponding to objects in the subset S', to the store1 controller from the store2 controller;

(i) determining which objects in the set S' have the version information that are one of newer than and conflicting with the version information of the store2, by the store1 controller;

(j) applying updates associated with the determined objects, by the store2 controller;

(k) updating the lists L of the store2 and store1, by the store2 and store1 controller; and (l) repeating steps (b) through (k), with roles of the store1 with respect to the store2 reversed, and roles of the store1 controller with respect to the store2 controller reversed.

25. The method according to claim 24, further comprising the step of maintaining respective data structures for the store1 and store2 comprising the filter F and the list L, by the store1 and store2 controller, respectively.

26. The method according to claim 24, wherein the version information of each object comprises a node identifier and a clock value.

27. The method according to claim 24, wherein the list $L^+$ comprises the object identifiers for the objects that were not previously shared between the store1 and store2 but should now be shared.

28. The method according to claim 24, wherein the list L− comprises the object identifiers for the objects that were previously shared between the store1 and store2 but should no longer be shared.

29. The method according to claim 24, wherein said determining step further comprises the step of obtaining the version information of the store2 controller, by the store1 controller.

30. The method according to claim 29, wherein said obtaining step comprises the steps of:

requesting the version information of the store2, by the store1 controller; and sending the version information of the store2 to the store1, by the store2 controller.

31. The method according to claim 30, wherein said requesting step comprises the step of sending a Summary Version Message Request.

32. The method according to claim 30, wherein said sending step comprises the step of sending a Summary Version Message Reply.

33. The method according to claim 24, wherein said method further comprises the step of sending the determined objects to the store2 controller, by the store1 controller.

34. The method according to claim 33, wherein said sending step comprises the step of sending a List of Updates Message.

35. The method according to claim 24, wherein the updates comprise a content, the identifier and the version information of the object.

36. The method according to claim 24, wherein said step of applying the updates comprises, for each update, one of the steps of:

copying a content of a determined object to a corresponding local object in the store2;

merging the content of the determined object with a content of the corresponding local object in the store2; and keeping an original content of the corresponding local object in the store2.

37. The method according to claim 24, wherein said step of updating the list L of the store2 comprises the steps of:

adding object identifiers to the list L of the store2 for all the updates that were not already present in the list L of the store2;

removing object identifiers from the list L of store2 for all the updates whose objects no longer satisfy the filter F; and updating the list L of the store1 with the list L'.

38. A program storage device readable by machine, tangibly embodying a program of instructions executable by the machine to perform method steps for synchronizing replica object stores store1 and store2 to enable partial sharing of objects therebetween, the method comprising the steps of:

(a) maintaining a first list L for store1 and a second list L for store2, the first list L and the second list L comprising object identifiers of the objects that are shared between store1 and store2 as of a last synchronization;

(b) applying a filter F to the objects in the store1 to generate a subset S comprising the objects in the store1 to be shared with the store2, wherein the filter F embodies an operation that can be applied to the objects in the store1 and store2, said applying by the store1 controller;

(c) incrementing version information of the objects that were not shared between the store1 and store2 as of a last synchronization but should now be shared, and of the objects that were shared between the store1 and store2 as of the last synchronization but should no longer be shared, by the store1 controller;

(d) transferring version information of objects in the store2 corresponding to objects in the subset S, to the store1 controller from the store2 controller;

(e) determining one of which objects in the subset S and identified by object identifiers in the first list L have the version information that is one of newer than and conflicting with version information of the store2, said determining by the store1 controller;

(f) applying updates associated with the determined objects, by the store2 controller;

(g) updating the lists L of the store2 and the store1, by the store2 and store1 controllers, respectively; and (h) repeating steps (b) through (g), with roles of the store1 with respect to the store2 reversed, and roles of the store1 controller with respect to the store2 controller reversed.

* * * * *